United States Patent
Kuo (10) Patent No.: US 9,051,923 B2
(45) Date of Patent: Jun. 9, 2015

(54) DUAL ENERGY SOLAR THERMAL POWER PLANT

(71) Applicant: Chang Kuo, Alhambra, CA (US)

(72) Inventor: Chang Kuo, Alhambra, CA (US)

(*) Notice: Subject to any disclaimer, the term of this patent is extended or adjusted under 35 U.S.C. 154(b) by 0 days.

(21) Appl. No.: 14/224,362

(22) Filed: Mar. 25, 2014

(65) Prior Publication Data
US 2014/0196455 A1 Jul. 17, 2014

Related U.S. Application Data (63) Continuation-in-part of application No. 13/871,960, filed on Apr. 26, 2013, now abandoned, which is a continuation-in-part of application No. 13/251,937, filed on Oct. 3, 2011, now abandoned.

(51) Int. Cl.
| | | |
|---|---|---|
| *B60K 16/00* | (2006.01) | |
| *F03G 6/00* | (2006.01) | |
| *F24J 2/24* | (2006.01) | |
| *F24J 2/50* | (2006.01) | |
| *F24J 2/52* | (2006.01) | |

(52) U.S. Cl.
CPC . *F03G 6/00* (2013.01); *Y02E 10/44* (2013.01); *Y02E 10/46* (2013.01); *F03G 6/005* (2013.01); *F24J 2/242* (2013.01); *F24J 2/50* (2013.01); *F24J 2/5233* (2013.01); *F24J 2/525* (2013.01)

(58) Field of Classification Search
USPC ............................................ 60/641.8–641.15
See application file for complete search history.

(56) References Cited

U.S. PATENT DOCUMENTS

| | | | | |
|---|---|---|---|---|
| 4,192,144 | A * | 3/1980 | Pierce ........................... | 60/641.8 |
| 4,404,958 | A * | 9/1983 | Boettcher ...................... | 126/625 |
| 6,571,548 | B1 * | 6/2003 | Bronicki et al. ................ | 60/772 |
| 6,936,947 | B1 * | 8/2005 | Leijon et al. ................... | 310/196 |
| 2004/0008010 | A1 * | 1/2004 | Ebrahim et al. ................ | 322/44 |
| 2005/0126170 | A1 * | 6/2005 | Litwin .......................... | 60/641.8 |
| 2008/0308093 | A1 * | 12/2008 | Gianasso et al. .............. | 126/622 |
| 2010/0090543 | A1 * | 4/2010 | Cobb et al. .................... | 307/149 |
| 2010/0175365 | A1 * | 7/2010 | Ota ............................. | 60/39.181 |
| 2011/0163603 | A1 * | 7/2011 | Chou et al. ....................... | 307/66 |
| 2011/0203573 | A1 * | 8/2011 | Hollis et al. .................. | 126/595 |

OTHER PUBLICATIONS

Siemens Air-Cooled Generators. Siemens AG (2010).*

* cited by examiner

*Primary Examiner* — Thomas Denion
*Assistant Examiner* — Mickey France
(74) *Attorney, Agent, or Firm* — Clement Cheng (57) ABSTRACT

A design of a dual energy solar thermal power plant is proposed. It can be built on a piece of land where sunshine is abundant and the moisture in the air is relatively low. The desert corridor starting at Las Vegas and to the south is the best in the whole U.S. The power plant design is simple, using the equipment and material commonly available at reasonable costs. No particularly complicated equipment and material are required. The optimized plant size will be one MVA up to 300 MVA depending on the available land size in acres. The transmission line voltage can be from 13.8 kV up to 230 kV, depending on the MVA capacity. The land for a plant can be up to 600 acres.

9 Claims, 7 Drawing Sheets

| Turbine-Generator MVA | Generator KV | Stepup Transformer Output Voltage KV |
|---|---|---|
| 1 | 6.9 | 13.8 |
| 10 | 13.8 | 24 |
| 50 | 13.8 | 69 |
| 100 | 22 | 115 |
| 150 | 22 | 115 |
| 200 | 24 | 230 |
| 250 | 24 | 230 |
| 300 | 24 | 230 |

Fig. 9

DUAL ENERGY SOLAR THERMAL POWER PLANT

This application is a continuation in part of inventor Chang Kuo's Ser. No. 13/871,960 Dual Energy Solar Thermal Power Plant, filed Apr. 26, 2013, the disclosure of which is incorporated herein by reference, which in turn is a continuation in part of U.S. application Ser. No. 13/251,937 entitled Dual Energy Solar Power Plant filed Oct. 3, 2011, by same inventor Chang Kuo the disclosure of which is incorporated herein by reference.

BACKGROUND

1. Field of the Invention

The present invention relates to the design of a dual source solar and thermal power generation plant that provides practical yet reliable power generation at low cost. In particular, the present invention relates to the design of a power plant with solar collectors and associated thermal power generating equipment, utilizing the proposed particular solar energy collectors, pressurizers, heat exchanger, auxiliary boiler/steam superheater, turbine-generator, generator frequency synchronizer, step-up transformer, switchyard and all thermal power generation supporting equipment. The scope of the invention includes the combination of the solar energy collector, main power plant equipment, and the power output facility to the outside power grid, to provide a complete power generation facility.

In the field of solar thermal power plants there are currently some other designs that make use of components such as parabolic solar collector, or reflecting mirror type. However, these other designs may have high cost or low efficiency concerns. The inventor's proposed design is intended to overcome these concerns.

2. Discussion of Related Art

The amount of solar energy that falls on the surface of earth per minute is equivalent to burning 100,000,000 tons of coal per minute. The average solar energy per square centimeter (cm) on the earth's surface per minute is about 2 calories. This is equivalent to 4,423 BTU per square foot per day. The solar energy received on each individual area will be different depending on the clouds, moisture in atmosphere, dust in the air, location and season. In the southwestern United States from Las Vegas to the Mexican border along the Colorado River, the solar energy per square foot is between 1880 to 2000 BTU per square foot per day. This is the highest BTU number among all areas in the United States. This is because the region is a desert area, and the air is extremely dry. This area has an average of over 300 sunny days per year. The area starting from Las Vegas along the Colorado River to the Mexico border and extended 150 miles each to the west and to the east from the river encompasses approximately 60,000 square miles. Of that area, by estimation, approximately 20%, or about 12,000 square miles (about 7,680,000 acres), is useful for solar collection. The potential in this desert area could accommodate 200 or more of 300 mega Volt-Ampere (MVA) size solar power plants. The total amount of power generated is sufficient to supply the power demands of the west coast and southwestern United States. With this kind of power potential, the construction of solar power plants in this area should be actively pursued. Building new power transmission lines to handle the generated power should also be considered.

With an estimation that only 60 more years of world oil supply, 80 more years of available nuclear fuel, 80 years of natural gas reserves and 300 more years of coal supply are left, the potential of solar energy in this area should be actively developed. If this were to be done, there would be no need for building additional coal or nuclear power plants.

Solar power could save the United States from the difficult problems of mining and refining the uranium for nuclear power fuel, treating and handling of unwanted spent nuclear fuel, greatly reducing the nuclear radiation harm to humans and the environment. It could also reduce the emission of additional $CO_2$ which is generated by burning coal in coal power plants, reducing pollutants and mitigating the life and environment-threatening problem of global warming.

The development of large scale solar power technology is a relatively new trend in the industry. Many solar power projects have been planned and/or initiated with a large amount of investment. However, the results have not met expectations. The progress of solar power generation technology has been less than expected. The returns on invested capital are mostly lower than the original investment. At present, the price of power generation by fossil fuel is still lower than by solar power. This is true especially for the photovoltaic type power plant. Many photovoltaic solar power plants have been abandoned during construction, or after short-term operation. Generally, bankers are hesitant to commit capital to solar power plant projects because the capital returns are less than anticipated. This is a disadvantage for harnessing solar power. The vast amount of solar energy that could be realized in this area has not been developed. A huge amount of potential solar energy is being wasted every day. This invention is designed to overcome these hardships and gives a way to increase the use of solar energy, harnessing solar energy more effectively and practically, until the technology progresses to a point where new ways of more efficient and practical use of solar power are discovered.

The photovoltaic solar power technology has gained considerable progress. It is now able to utilize 12 to 15 percent of incoming solar energy. Yet this is far below the 35% efficiency of a nuclear power plant, or 38% for a fossil power plant. The majority of the solar energy is not effectively used by photovoltaic technology, as there are several disadvantages in the present photovoltaic technology. First, the silicon film of its main component is delicate and expensive to manufacture. At least seven different films are needed to make a final product of silicon plate. The silicon film is only a semi-conductor. It cannot pass a large amount of electric current. A copper or aluminum conductor mesh or net is required for taking the electrical current out. The electrical current produced is of low voltage and (low) milli-ampere current. Therefore a high number of silicon plates must be needed to make the current large enough to be meaningful. On top of this, only a narrow band of photo wavelength of sunlight can excite the electrons in the film to produce current. Overall, the produced current is of low voltage and low current. In addition, the produced current is a direct current (DC). The DC power generated in this system is not suitable for long-distance transmission to electrical power users because the DC current is not suitable for long distance transmission. So the DC current has to be converted to AC (alternate current), in order to be transmitted to the far-end power users. Each step of conversion increases power loss and adds to the overall cost. The total equipment cost of a photovoltaic solar power system would be too high for a large power output, for example, from one to 300 megawatts (MW) class power plant. The plant would be economically prohibitive and the rate of solar energy utilization would be low. The efficiency is also low. Worse, under strong bombardment of ultra-violet (UV) radiation from the sun, the high cost silicon solar panels deteriorate rapidly. The deteriorated silicon plates would need to be replaced regularly. This would happen before the investment capital could be recovered. Therefore, a large output photovoltaic power plant is not commercially practical today. Many plants have previously been planned, built, and then abandoned. Those are examples of failed economical activities. A solar power plant output of more than 300 MW is considered impractical considering that a large area of land is required and the cost is high.

The next choice is the solar thermal power plant. As mentioned in paragraph [0002], the mirror reflection type and the parabola solar receiver type have been designed and some are in operation. The results are not encouraging. Some have been abandoned and some are operating with high cost and low efficiency. For two examples, a parabola solar receiver type power plant with 150 MW in the Mojave Desert, Calif. had been abandoned; and the Ivanpar mirror reflection type solar thermal power plant costs $2.2 billion for an output of 395 MW, the cost is too high as prohibiting. In this specification a particular design is proposed for a new type of dual energy solar thermal power plant. It is a steam turbine-generator power plant using a combination of solar energy collectors and a small auxiliary boiler/steam superheater. The objectives for the invention of this plant are to be efficient, cost effective, practical and reliable.

For a low temperature turbine set as proposed to be used in this design, a minimum steam temperature of 680° F. (360° C.) is required to drive the turbine. This is difficult to achieve by the proposed solar collector alone because the received solar rays alone cannot deliver quickly and consistently the large amounts of energy required to drive a turbine continuously. The quantity of incoming solar energy is not as large as the thermal energy coming from a nuclear reactor or a coal fired boiler as used in a coal fired power plant. To compensate for the insufficient thermal energy provided by solar rays alone for driving the turbine, an auxiliary boiler/steam superheater is needed to supply additional heat in addition to the collected solar heat. This would guarantee stable long-term turbine operation. See FIG. 8. The facility built based on this design could also be used for power generation during cloudy or raining days.

A frequently asked question is, where would the power come from at night if solar power becomes the main power source? The answer to this question would be the combination of hydropower, enlarged battery facility, and stored thermal energy in a liquid salt container facility, plus the fact that the night power demand is low after 10 PM. The auxiliary boiler as proposed in this specification can also be used to generate small amounts of power for short periods.

The design proposed in this specification offers advantages of: (1) lower cost because the design is simple, and the equipment used are mostly common in the market with reasonable costs; (2) high efficiency because the proposed solar collector will take in all solar heat available; (3) reliable because all equipment is commonly available with proven good operational records; and (4) practical because there is no unreasonable design, uncommon equipment, or unreasonable operation procedures. These are the advantages offered by this system design over other types of solar thermal power plants such as the parabola solar collector type, or the mirror reflection solar collector type.

The auxiliary boiler/steam superheater will require burning low amounts of natural gas to supply about 20% or the balance of the required heat. But the advantage is that this heat is being used to harness large amounts of unrealized no-cost solar power continuously when it is integrated with the solar energy collector. If the auxiliary boiler is not added, 0% of solar power can be used in this facility. The choice is obvious.

Newly developed technology of "fracking" for mining natural gas has increased production of natural gas. It has been said that the gas can last for the next 100 years. If carefully planned and combined with the solar energy collecting system proposed in this specification, the gas availability could be extended to 500 years. By that time, additional new technologies may be discovered for obtaining needed energy.

In the rate of conversion of solar energy to electricity, it is estimated that an area of about 600 acres is required for a 300 MVA solar thermal power plant. Two hundred such plants would supply an output of 60,000 MVA, enough to supply the total new power demands of the entire west coast of the United States while retiring all nuclear power plants and the coal fire power plants.

When this energy corridor is developed in the southwest United States using the proposed power generation design, the electricity will become abundant and it will support the automobile electrification, further mitigating the air pollution for the country.

The three most important engineering considerations for a solar thermal power generation plant are: (1) harvesting the solar energy, (2) preserving the harvested solar energy, and (3) utilizing the solar energy.

First, the necessary technical aspect is how to collect and absorb the solar energy efficiently; and the next is how to preserve the collected energy without losing it.

Finally the collected and preserved solar energy should be able to be utilized to generate electrical power. In this invention, it is proposed to use the collected solar heat to heat water or another heating medium to the required temperature such that the final product, the heated steam, has sufficient pressure to drive the turbine-generator set within a solar thermal power plant. The sufficient steam temperature to drive the turbine is estimated at about 680° F. (360° C.).

As mentioned above, low cost, efficiency, reliability and practicality are the main objectives of this invention. It is necessary that the plant cost be reasonable and the plant is robust for long-term operation. Otherwise, it would not be practical for the capital investment. It would not be feasible to build a solar thermal power plant if the equipment, labor and fuel costs are too high. There have been too many high capital solar power plants abandoned because of high cost, low efficiency, or short duration of effective operation time. The economics of the plant and long-term effective operation are crucial to make the plant practical.

SUMMARY OF THE INVENTION

A solar energy collector comprises a solid body having a substantially flat, planar solar energy absorbing collecting surface. The solid body has a first thickness at a center portion tapering to a second thickness at each of a pair of opposing edge portions defining a width of the body. A bore extends completely through the body along its length and is aligned along an axis at the center portion. A thin window transparent at selected solar energy wavelengths (for example, ultra violet, infrared-red solar radiations and the spectrum in between) is disposed at a distance from the collecting surface, the window sealed around a periphery of the collecting surface to define a sealed vacuum gap between the collecting surface and the bottom surface of the window. The vacuum gap instead of an air gap will prevent the heat conduction by air from the solar collecting surface to the bottom face of the window, as the oxygen in the air is highly heat conductive. The heat at the bottom face of the window would find its path to the top surface of the window and then dissipate to the atmosphere, so this heat loss must be prevented.

An alternative is to fill the gap with nitrogen gas instead of leaving the gap as a vacuum. At a certain degree of vacuum, a flat glass will break because of the atmospheric pressure. The nitrogen gas inside the gap will resist the atmospheric pressure, preventing the glass from breaking. Nitrogen gas is more stable than oxygen in the gap; hence, nitrogen gas will reduce the heat loss from the glass to atmosphere.

Another possibility is to use an arched type of glass instead of a flat one. When atmospheric pressure applies on the arched type glass, the component stress forces will be routed to the sides and then be absorbed by the solar collector metal plate, preventing the glass from breaking when the gap is in a vacuum state. This application is similar to the application of an arch type dam at a river or a lake. The window glass thickness is to be 1/16 of an inch or less for maximum solar radiation transpierce effect.

In one embodiment, the first thickness at the center portion of the solar collector may be about 2.5 to about 3 inches, the second thickness at the opposing edges may be about 0.25 inch to about 0.5 inch, and the first thickness tapers to the second thickness substantially linearly. The bore hole may have a diameter of about 2 inches. The thicker central portion of the body is to provide higher heat sink and to provide sufficient space for the bore to be completely inside the body. Another effect is to provide sufficient mechanical strength to bear the pressure from high temperature water or liquid. The thin both edges are for the purpose of lower cost by saving quantity of material.

The planar solar energy absorbing collecting surface is black or red in color, as the black and red colors are the most efficient for absorbing solar energy among all colors in the visible light spectrum, and solar radiation with wavelengths between ultra-violet to infrared-red. The body may be formed using different techniques. One such technique is casting and another is extrusion. The body may be formed from a metal, such as aluminum, since aluminum is highly heat conductive and low cost among other metals. In embodiments where the body is formed from aluminum, the planar solar energy absorbing collecting surface may be black anodized or may be painted black. The same can be applied for the red color. The black or red anodized aluminum coating on the aluminum body offers the most efficient solar energy absorbing capability. The window may be formed from glass transparent at all energy carrying solar radiations with wavelengths between UV wavelength and infrared-red wavelength.

The solar energy collectors are lined up in many linear columns in a wide area, increasing solar energy collecting surface. See FIG. 6. A plant with this design has the advantage over a nuclear power plant because no radioactive materials are involved and is at a much lower cost. The plant has the advantage over a coal fired power plant, because there is much lower $CO_2$ emission, and much lower pollutants. The plant cost is considerably lower and consumed fuel is only a fraction of that of the coal power plant. The plant has the advantage over a photovoltaic solar power plant, especially on plant cost and the efficiency. The same is true over a mirror type solar thermal power plant, and a parabola type solar thermal power plant, for cost and efficiency.

Water, propylene glycol or liquid salt can be used for heat transfer material in the solar collector. Water is abundantly available, the cheapest, and the easiest to handle. Propylene glycol has excellent properties for transporting heat. Liquid salt can store heat for many hours. It can be used for power generation after sunset.

When water is heated to 212° F. (100° C.), it will start to boil and generate steam. The steam volume will expand and pressure will increase in the pipe. This is not desirable during the preliminary heating process. One way to maintain the high temperature water in the liquid state is to add a pressurizer in the water circulating system. It will maintain water in the liquid state.

The 680° F. steam is a difficult objective to achieve by the proposed solar collector alone. With the proposed solar collector, when ordinary insulation is used, the collector temperature could be brought up to 300° F. When the vacuum technique is applied on the collector, the temperature will be brought up to 500 to 600° F. It is still lower than the required 680° F. In order to raise the temperature to 680° F. as required, a natural gas heated boiler/steam superheater is needed, otherwise the desired condition cannot be met. The steam turbine-generator set requires extremely high energy steam to drive at any moment during operation, but the incoming solar energy is lower and slower than the demand, therefore a natural gas burning auxiliary boiler/steam superheater is needed to supplement either the balance of heat. In the past decade the production of natural gas has increased dramatically in the US owing to new fracking technology. Large volumes of previously unobtainable natural gas have become extractable. The new estimate for natural gas reserves in the US is expected to last for 100 more years (from 80 years previously estimated). If natural gas is used as the supplement to solar energy, and if it is used for supplying 20% of energy required for power generation, then the natural gas availability could be extended by five times, or 500 more years. It is reasonable to predict that solar energy technology would advance in 500 years. An auxiliary boiler/steam superheater can also be used for power generation during cloudy or raining days.

Although the use of an auxiliary boiler/steam superheater within a dual source solar thermal power plant will burn a small amount of natural gas, making it not a 100% solar power plant, it is a better choice between being able to use 0% (without auxiliary boiler) or 90% (with auxiliary boiler) of solar energy. No solar energy can be obtained if no power plant is in operation especially in the desert area. The use of an auxiliary boiler/steam superheater is justified.

Solar power is one of the most precious gifts given by nature. Even the coal being used today came from trees that existed 100 million years ago. Those trees stored the solar power of 100 million years ago. The solar power of long time ago benefits the society today in the form of coal. The present day solar power should be actively developed.

The major equipment in a solar thermal power plant, in addition to the solar energy collector, shall also include piping, valves, pumps, heat exchanger, temperature sensor, pressurizer, auxiliary boiler/steam superheater, condenser, deaerator, turbine-generator set, generator synchronizer, switchgear, step-up and auxiliary transformers, high voltage circuit breaker, switchyard, water tanks, and water reserve pool if desired. The insulation material for the solar energy collectors, piping, and tanks are also necessary and important to preserve the heat.

The pumps shall include the heat transfer fluid circulation pump, feed pump, and the condensate pump at a minimum. The pressurizer is used for maintaining high temperature high pressure water or fluid, otherwise the water will become low temperature steam prematurely. The temperature sensor shown in the diagram will be used for diverting the water or fluid direction to either be reheated again by solar collectors or if it is hot enough to go to the next equipment in the process, namely heat exchanger. The function of the deaerator is to remove the detrimental oxygen from the water. The functions of the heat transfer fluid circulation pump, feed pump and the condensate pump are as the names imply.

The generator synchronizer is used to synchronize the generated electrical current to be in-phase with outside electrical current in the power grid. Otherwise, there could be a huge power disturbance in the power grid which might cause a black-out. The step-up transformer is for the purpose of raising the outgoing power voltage to a suitable high voltage for long distance power transmission. The auxiliary transformer is provided to supply all auxiliary power needed for plant operation. The switchyard is provided for locating the major transformers and high voltage switching equipment, such as high voltage circuit breaker.

A design of a dual energy solar thermal power plant is proposed. It can be built on a piece of land where sunshine is abundant and the moisture in the air is relatively low. The desert corridor starting at Las Vegas and to the south is the best in the whole U.S. The power plant design is simple, while using equipment and material commonly available at reasonable costs. No particularly complicated equipment and material are required. The optimized plant size will be one MVA up to 300 MVA depending on the available land size in acres. The transmission line voltage can be from 13.8 kV up to 230 kV, depending on the MVA capacity. The land for a plant can be up to 600 acres.

A solar energy collector comprises a solid body having a substantially planar solar energy absorbing collecting surface. The solid body has a first thickness at a center portion tapering to a second thickness at each of a pair of opposing edge portions defining a width of the body. A bore extends completely through the body along its length and is aligned along an axis at the center portion. A window transparent to most solar radiation in the visible spectrum and near UV to infrared-red solar energy wavelengths is disposed at a distance from the collecting surface, the window sealed around a periphery of the collecting surface to define a sealed vacuum gap between the collecting surface and the bottom surface of the window. The solar energy collector is a major component of the power plant.

A turbine-generator set with all of its auxiliary equipment and components are included in a plant. To supplement the insufficient thermal power from the solar energy, an auxiliary boiler/steam superheater is required as a standby. A switchyard to locate and enclose the stepup transformer, the high voltage circuit breaker and the outgoing high voltage power line is provided.

Because of the simplicity of design, this type of plant will have a much lower plant cost and can be built in a relatively short time. The savings in fuel cost as compared with a 600 MVA class coal fired power plant is about $24 million annually per plant. It would also reduce about 500,000 tons of emission of $CO_2$ to the atmosphere per year. It will be able to resolve the safety problems of a nuclear power plant, because there is no radioactive material involved. The catastrophes of the Three-mile Island, the Chernobyl in Ukraine, and the Fukushima in Japan plants are well-known and horrible.

BRIEF DESCRIPTION OF THE DRAWING FIGURES

FIG. 6 is another plant arrangement diagram of showing the same illustrative solar power generating plant in accordance with the present invention. FIG. 5 is a schematic diagram and FIG. 6 is a plant arrangement drawing. Both figures supplement each other. Not all equipment are shown on both diagrams simultaneously for the sake of simplicity.

The following call out list of elements references the elements of the drawings.
10: Solar Energy Collector
12: Body
14: Planar Solar Energy Absorbing Collecting Surface
16: Center Portion
18: Pair of Opposing Edge Portions
20: Bore
22: Window
24: Sealed Vacuum Gap
26: Frame
28: Layer of Insulation
30: Mounting Structures
32: Upright Support Members
34: Concrete Foundation
36: Horizontal Support Member
38: Vertical Members
40: Solar-thermal Electrical Power Generating System
41: Pressurizer
42: Heat Exchanger
44: First Coil
46: Heat Transfer Fluid Circulation Pump
48: Fluid Storage Tank
50: First Valve
52: Secondary Coil
54: Steam Superheater
56: Steam Section
58: Water Section
60: Burner Section
62: Steam Turbine
64: Electrical Generator
66: Condensate Pump
68: Condenser
70: Feed Pump
72: Deaerator
80: Solar collector Array
82: Temperature Sensor
84: Second Valve
86: Third Valve
88: Fourth Valve
90: Fifth Valve 92: Sixth Valve
94: Access Road
96: Synchronizer
98: Switchgear (SWGR)
100: Stepup Transformer (Stepup XFMR)
102: Auxiliary Transformer (Aux. XFMR)
104: High Voltage Circuit Breaker (HVCB)
106: Outgoing High Voltage Power Line
108: Switchyard (SWYD)
110: Arch Type Window

DETAILED DESCRIPTION OF THE PREFERRED EMBODIMENT

Figure 1:
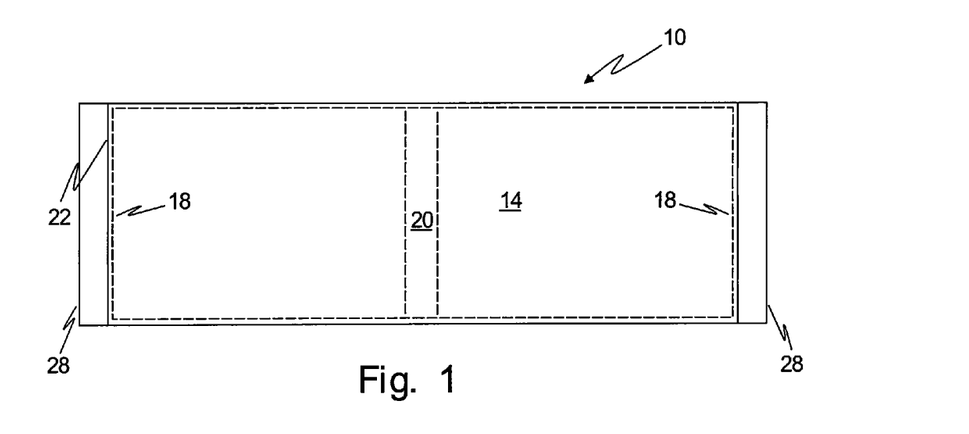
FIGS. 1 and 2 are diagrams showing top and cross-sectional views, respectively, of an illustrative solar energy collector in accordance with one aspect of the present invention.
Figure 2:
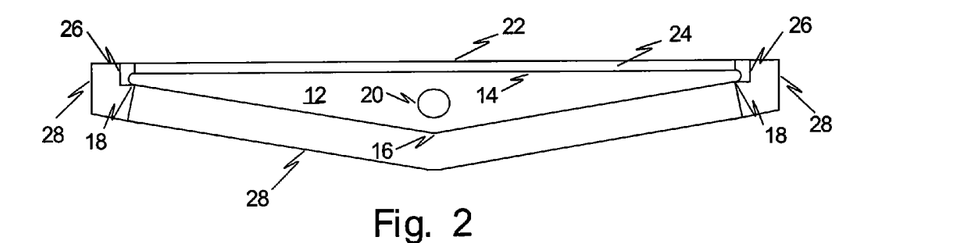
Figure 3:
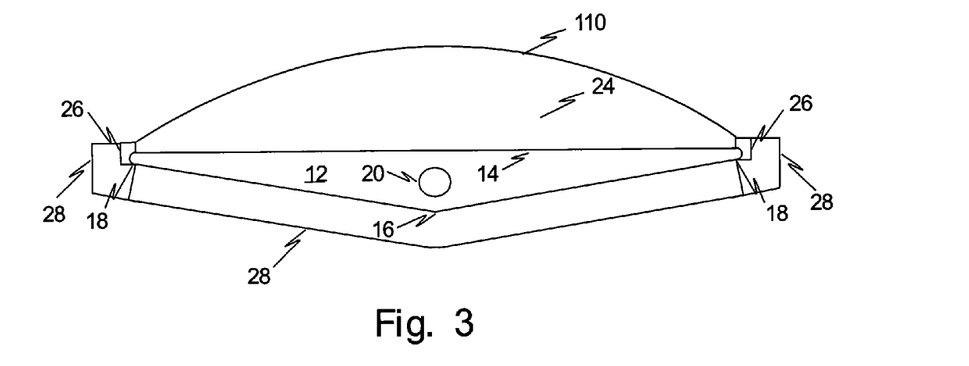
FIG. 3 is another cross-sectional diagram with an arched type glass instead of a flat glass.

Persons of ordinary skill in the art will realize that the following description of the present invention is illustrative only and not in any way limiting. Other embodiments of the invention will readily suggest themselves to such skilled persons. Referring first to FIGS. 1 and 2: The diagrams show top and cross-sectional views, respectively, of an illustrative solar energy collector 10 in accordance with one aspect of the present invention. FIG. 3 shows the solar collector cross-sectional view if an arch type glass is used instead of a flat one as shown in FIG. 2.

The solar energy collector 10 comprises a solid body 12 having a substantially flat planar solar energy absorbing collecting surface 14. The body 12 is formed from an efficient heat conductive material, yet the cost is low enough to make the power plant feasible. The planar solar energy absorbing collecting surface 14 should be configured to maximize energy absorption. In some embodiments of the invention, the collecting surface 14 is black in color. The red color is also acceptable, because it is another color efficient for absorbing sun heat. The red color can be selected for aesthetic reasons, or when black color paint is not available. The body 12 may be formed from a metal, such as aluminum. The body 12 may be formed using different techniques. One such technique is extrusion, made possible if the body 12 is uniform in cross section along its entire length. Persons of ordinary skill in the art will appreciate that other techniques, such as casting, may be employed to form the body 12. In embodiments where the body 12 is formed from aluminum, the planar solar energy absorbing collecting surface 14 may be black or red anodized or may be painted black or red with non-reflective or low-reflective paint to maximize energy absorption. The black or red anodized aluminum coating on the aluminum body offers high efficiency solar energy collection. A window 22 may be formed from glass transparent to the majority of solar radiation in the visible spectrum from near ultra-violet to infrared-red, comprising the major portion of the energy in sunlight.

In one exemplary embodiment, the first thickness at the center portion of the body 12 may be about 2.5 to about 3 inches, the second thickness at the opposing edges of the body 12 may be about 0.25 to about 0.5 inch. In one embodiment of the invention, the first thickness tapers to the second thickness substantially linearly. The thicker central portion of the body is to provide higher heat sink and to provide sufficient space for the bore to be completely inside the body. Another effect is to provide sufficient mechanical strength to bear the pressure from high temperature water or liquid in the bore. Both thin edges are for the purpose of lowering costs by saving quantity of material. The body 12 may be formed in lengths suitable for particular embodiments of a solar generating apparatus. In one embodiment, the body 12 may have a width of about 2 feet, and persons of ordinary skill in the art will appreciate that the length selected for any installation will be a function of practical considerations dictated by the particular application. In one embodiment a length of about 8 feet may be used, although persons of ordinary skill in the art will appreciate those considerations, such as collector weight, may affect the choice of length.

The solid body has a first thickness at a center portion 16 tapering to a second thickness at each of a pair of opposing edge portions 18 defining a width of the body. A bore 20 extends completely through the body along its length and is aligned along an axis at the center portion 16. In use, the bore 20 carries a heat-transfer fluid such as water, propylene glycol, liquid salt or other heat-transfer fluid used to transfer the collected heat to where it will be used. To connect two adjacent pieces of the solar energy collectors between the bores, a short flexible plastic or rubber pipe can be used. The pipe must be able to bear high temperature. It can be snapped in and dispensable.

The window 22 transparent for most energy carrying solar radiations with wavelengths between UV wavelength and infrared-red wavelengths is disposed at a distance, about ¼ inch, from the collecting surface 14. The window is formed from a material, such as a glass material, that is substantially transparent at most selected solar energy bandwidths. The window 22 is sealed around a periphery of the collecting surface to define a sealed vacuum gap 24 between the collecting surface 14 and the bottom surface of the window 22. In one particular embodiment, a window formed from a glass sheet having a thickness of about 1/16 inch or below shows most effective in passing solar energy bandwidths and traps heat inside the vacuum gap. If the gap space is not under vacuum, the air inside will move around and take the heat to the glass. The heat will go through the thickness of the glass and dissipate back to the atmosphere. However, there is a problem when making the gap a vacuum. At a certain degree of vacuum, the external atmospheric pressure is enough to break the glass. The glass breaking occurs when the vacuum is about one-third to one-half of a complete vacuum. Therefore, the gap should be left at an one-third vacuum or employ one of the two following alternatives.

The first alternative is to fill the gap with nitrogen gas, since nitrogen is more stable than oxygen in the gap, it will reduce the rate of heat loss from the glass and resist the external atmospheric pressure.

The second alternative is to make the shape of glass as an arch type, just like an arch dam. The atmospheric pressure applied on the glass is distributed evenly into two branches, one on each side. Each of the two component forces ends on the side and is absorbed by the solar energy collector body, preventing the glass from breaking.

The glass is a high density material compared to air. A glass with thickness higher than 1/16 inch would decrease the passing of solar radiation considerably, making it less effective. The window is enclosed in a frame 26. The frame is configured such that it is easily snapped onto the body 12 for replacement. The frame should also be insulated with a high grade of insulation material.

A layer of insulation 28 is disposed below the body 12 on the surface opposite the collecting surface 14 and both sides of the body 12 to prevent heat collected in the body 12 from being dissipated back into the ambient air. By preserving heat in the body 12, the layer of insulation 28 increases the temperature of the body 12 and increases the efficiency of heat transfer of the solar energy. The insulation material should be high grade to prevent the heat loss to the surrounding air. This is necessary for raising the water or liquid temperature toward 680° F. level for performing power generation. The thickness of layer 28 will depend on its construction. Persons of ordinary skill in the art will appreciate that the composition of insulation 28 should be selected considering the conditions of the outdoor environment in which solar collector 10 will be employed, including, but not limited to, heat, solar radiation, wind, precipitation, etc. Numerous outdoor-rated insulating materials are available.

It is thought that the solar energy collector 12 in the form of a black painted aluminum body as disclosed in one embodiment of the invention will absorb 95% of the incoming solar energy. Hence, this is a particularly efficient solar energy harvest system. Aluminum has a high heat conductivity and low cost. It is extremely cost effective and makes the system practical.

Another alternative color to the black color to be applied to the solar energy collecting surface is the color red. Although the red color is a little less efficient for absorbing solar energy than the black color, the difference is not appreciable. In cases where availability of black paint is in question, or the red color is preferred over the black color for the aesthetic reasons, then the red color can be used.

Figure 4:
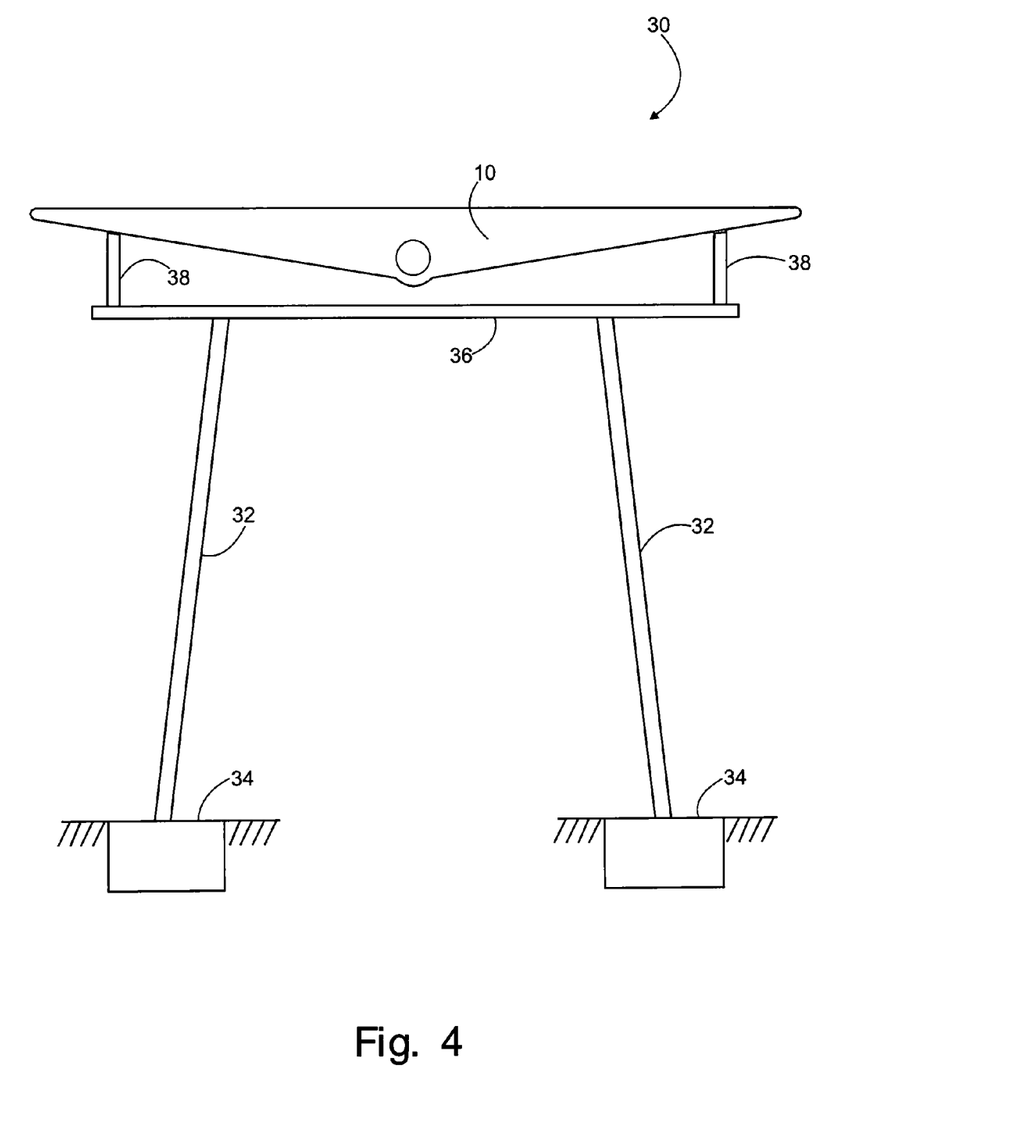
FIG. 4 is a diagram showing one way of mounting an illustrative solar energy collector in accordance with one aspect of the present invention.

Referring now to FIG. 4, a diagram shows one illustrative way of mounting an illustrative solar energy collector 10 in accordance with an aspect of the present invention. The collector 10 is mounted on a mounting structure 30 or frame including upright support members 32. Support members 32 may be anchored in concrete as shown at reference numeral 34. A horizontal support member 36 is supported by upright supports 32. Vertical members 38 extend upward from horizontal support member 36 and support the lower surface of collector 10. Window 22 and insulating layer 28 are not shown in FIG. 4 to avoid overcomplicating the figure. Persons skilled in the art will appreciate that support members 32, 36, and 38 may be formed from a suitable material such as metal, and that a pair of mounting structures 30 may be utilized for each collector 10 in an array of such collectors. Although not necessary, the height of the support structure may be about 4 feet for easier access and ease in performing maintenance work.

Persons of ordinary skill in the art will appreciate that the solar energy collector 10 of FIG. 1 may also be movably mounted in a configuration that will allow it to track the solar movement in order to orient the planar solar energy absorbing collecting surface 14 as nearly normal to the direction of solar radiation as possible. Techniques and apparatus for enabling such tracking are well known in the art.

Persons of ordinary skill in the art will appreciate that the solar energy collector 10 of FIG. 1 may be used in a number of applications other than electrical power generation. Applications such as heating water for domestic use and for implementing solar hot-water domestic and commercial building heating systems are contemplated for the solar energy collector 10 of FIG. 1 in accordance with the present invention.

Figure 5:
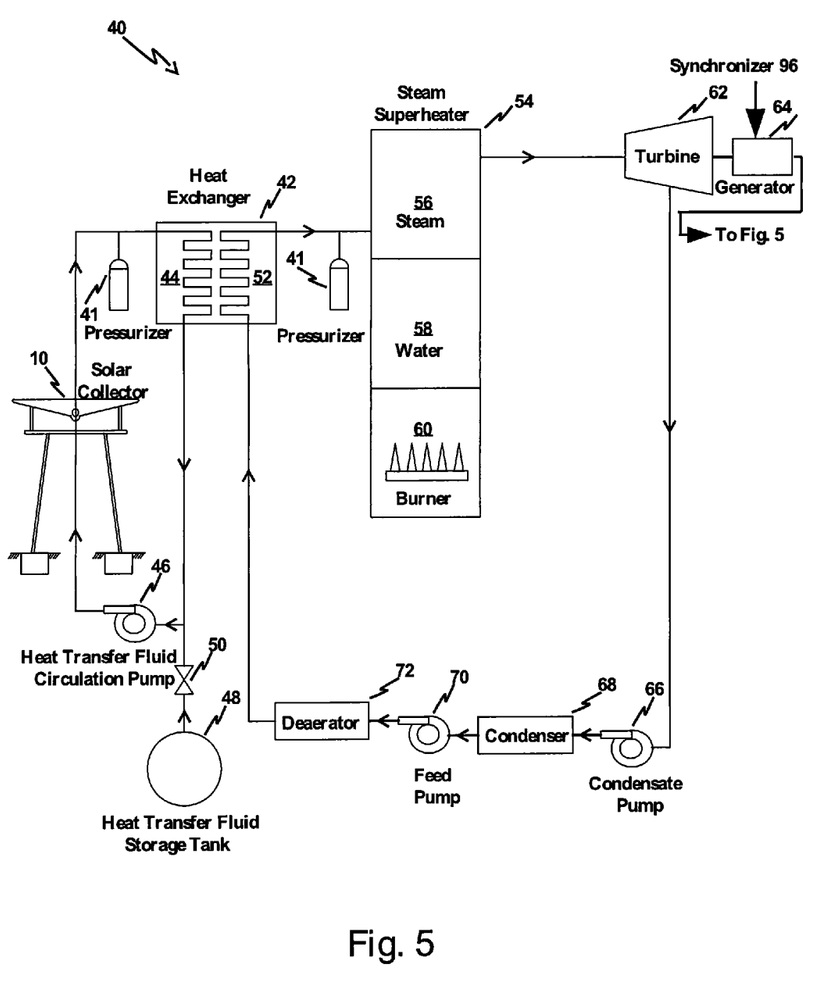
FIG. 5 is a schematic diagram showing how the solar collector according to the present invention may be employed in a solar power generating plant. The shown solar collector is a simplified cross sectional view of a miles-long solar collector line. It is by no means only a simple piece of equipment, see also FIG. 6.

The solar collector 10 of FIG. 1 is most suitable for use in electrical power generation systems according to the present invention. Referring now to FIG. 5, a schematic diagram shows how the solar collector 10 according to the present invention may be employed as a component of a solar power generating plant in accordance with the present invention.

An illustrative solar-driven electrical power generating system 40 includes the solar collector 10. The shown solar collector 10 is a simplified cross section view of a long solar collector line. Persons of ordinary skill in the art will appreciate that a plurality of solar energy collectors 10 may be configured in series, by coupling together the bores 20 of an arbitrary number of solar energy collectors 10 using plumbing piping. Persons of ordinary skill in the art will appreciate that pipes used to connect solar energy collectors 10 to each other and to other components of the system to be described herein, would be covered by a layer of surrounding insulation in order to maximize efficiency by preventing unnecessary heat loss in the system.

The solar-driven electrical power generating system 40 includes a heat exchanger 42 that is used to transfer the heat from the heat-transfer fluid circulating in a primary loop that includes solar energy collectors 10, a first coil 44 in the heat exchanger 42, and a heat transfer fluid circulation pump 46. The heat-transfer fluid is under pressure in a closed system and thus may be allowed to reach temperatures in excess of its boiling temperature at atmospheric pressure. A pressurizer 41 is required to maintain the liquid state under pressure due to high temperature. The heat-transfer fluid can reach temperatures in excess of about 680° F. (360° C.) before turning to steam. As previously noted, the heat-transfer fluid may be water, or another heat transfer fluid such as propylene glycol, liquid salt or the like. A storage tank 48 for providing make-up heat-transfer fluid is coupled to the primary loop through the first valve 50 to allow for compensating for loss of heat transfer fluid.

The heat exchanger 42 transfers the heat collected from the primary coil 44 to a secondary coil 52 through which water is circulated. The heated water flows to the superheater 54 in which a steam section 56 provides superheated steam for driving the power plant. The steam superheater 54 is a low rating superheater that also includes a water section 58 and a burner section 60. The burner section 60 may be used to drive the power plant at night or during cloudy periods where the solar energy output of collector 10 is not sufficient to drive the system. In such case, it is used as the auxiliary boiler. The steam superheater is known in the art and its design is a matter of routine engineering.

Steam from the steam superheater 54 is fed to a steam turbine 62 that drives an electrical generator 64 to provide the electrical power output of the power plant 40. The exhausted steam is fed to condensate pump 66 and to a condenser 68 and change back to the water. The water will then be fed through a feed pump 70 to a deaerator 72 as is known in the art. The output of the deaerator 72 is coupled to the secondary coil 52 in the heat exchanger 42 to complete the secondary loop. The function of the deaerator 72 is to take out the oxygen dissolved in the water because the oxygen in the water will do harm to the equipment such as rusting and other damages.

The target efficiency for solar power utilization of the system of FIG. 5 is 50%. Because of using low cost material, the anticipated solar thermal power plant cost is less than 20% of the cost of a traditional coal-fired power plant having the same electrical power output. Compared to a nuclear power plant (estimated to be $1.2 billion for a 1,000 MW plant), the cost of a solar thermal power plant according to the present invention is less than 10% of a nuclear power plant if the fact that a coal power plant cost is less than half of a nuclear power plant having the same power output is considered. Because of many nuclear power regulatory requirements, the time required to build a solar thermal power plant is much shorter than building a nuclear power plant. This is certainly a significant advantage. The saving on fuel cost is another advantage. The most important advantage over coal power plants is the reduction of significant amounts of carbon dioxide emission. The most significant advantage over nuclear power plants is the elimination of the risks of harm to life and environment posed by the radio-active materials which are present in mining, manufacturing, operating and radiation-waste treatment of the spent nuclear fuel.

Figure 6:
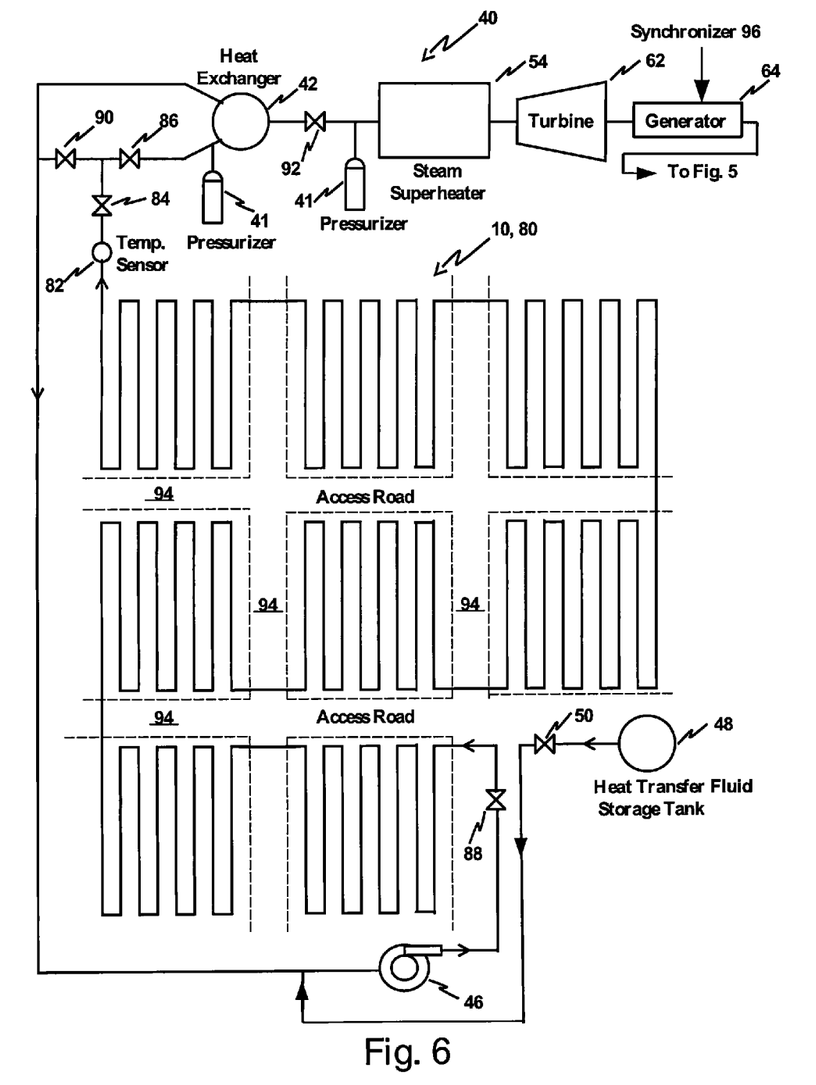

Referring to FIG. 6, a diagram of plant arrangement which shows another way of illustration of the same large-scale solar power generating plant 40 given in FIG. 5, in accordance with the present invention. The FIG. 5 is a schematic diagram and the FIG. 6 is an arrangement diagram, both complement each other. Not all equipment in the plant are shown simultaneously in either figure for simplicity and for clear illustration.

The solar power generating plant 40 shown in FIG. 6 includes an array 80 of solar energy collectors 10 of FIG. 1. The solar energy collectors 10 may be disposed in a continuous line except for turns at the edges. The connections at the turns are by installing suitable pipes of the same diameter as the bore hole. The pipes are properly insulated. As previously noted, the height of the solar energy collectors may be about 4 feet for easier access and ease in performing maintenance work.

The primary loop in the solar power generating plant 40 includes an array 80, temperature sensor 82, the second valve 84, the third valve 86, a primary coil (not shown) in a heat exchanger 42, a pressurizer 41, a circulating pump 46 and the fourth valve 88 (88 is not shown on FIG. 3). Upon system startup, and thereafter, whenever the temperature sensor 82 indicates that the temperature of the heat-exchange fluid in the array 80 is less than a desired setpoint temperature, the third valve 86 is closed and the fifth valve 90 is opened, allowing the heat-exchange fluid to recirculate in the array 80 until the desired setpoint temperature is reached. At which time the third valve 86 is opened and the fifth valve 90 is closed. The heated fluid flows into the heat exchanger 42. A heat-exchange fluid tank 48 is used to provide replenishment of lost heat-exchange fluid as desired through the first valve 50. The function of the pressurizer 41 is to maintain the water or liquid in liquid state when the temperature is above boiling point.

During system operation, the secondary coil (not shown) of the heat exchanger 42 provides the highly heated fluid into the steam superheater 54, which operates in the manner described for the FIG. 5. The sixth valve 92 is installed in the pipe for the purpose of controlling the heated fluid flow from the heat exchanger to the steam superheater. The second pressurizer 41 is again provided to prevent the fluid from turning into steam prematurely. The output steam shootout from the steam superheater is to enter and drive the turbine 62, which, in turn, drives the generator 64. The steam superheater is also used as the auxiliary boiler. It will provide needed heat at night or cloudy days for power generation when required. A synchronizer 96 is provided to synchronize the generated power current with the power current in the outside power grid to prevent a large grid fault, or a blackout.

Figure 7:
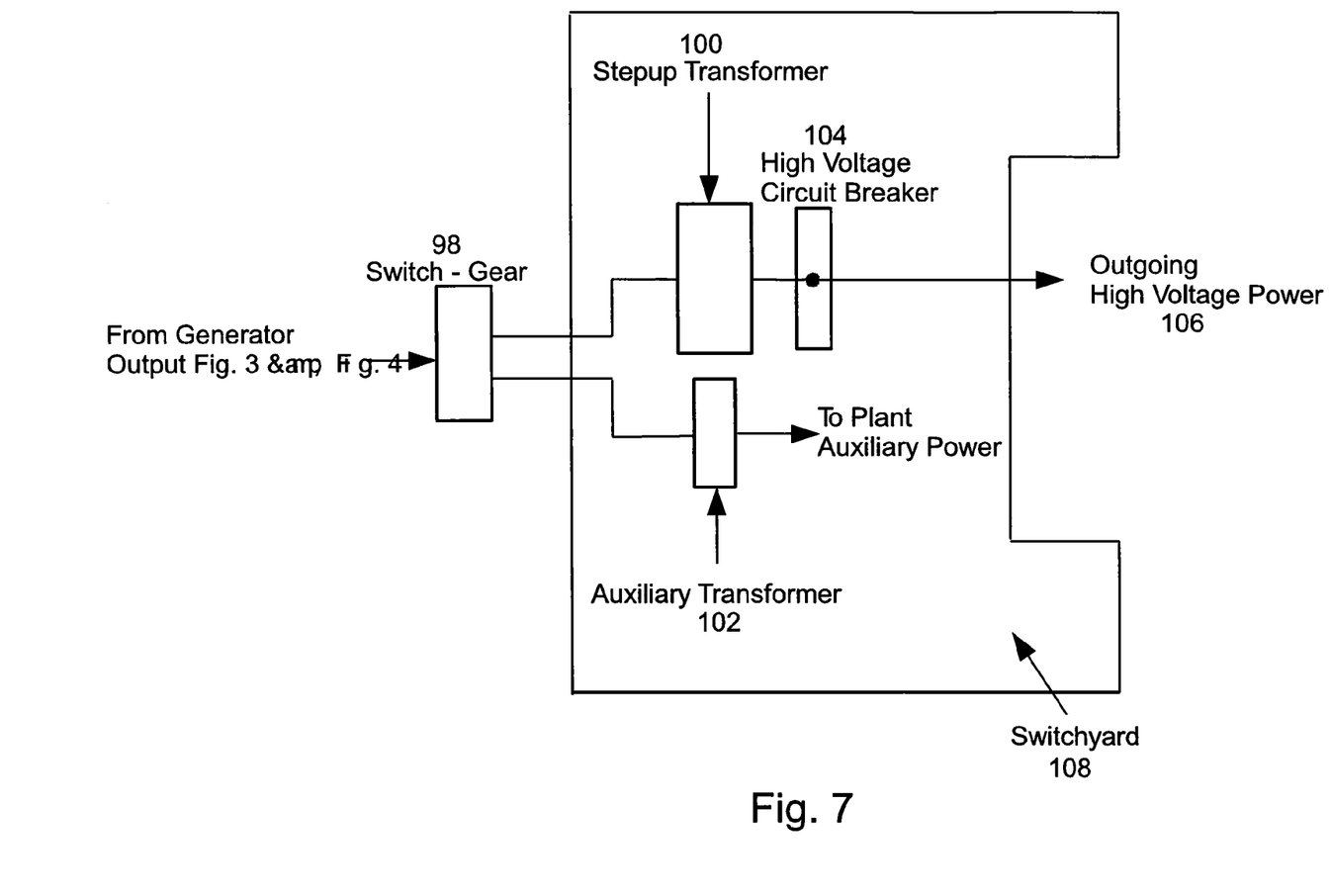
FIG. 7 is an arrangement diagram of the generator output switch-gear, the switchyard, the transformers, the high voltage circuit breaker, and the outgoing high voltage power line.

Referring to FIG. 7, a diagram to show that the electric current output from the generator 64 is fed into a switch-gear 98. From there, the current is divided into two branches, one large branch is fed into the main stepup transformer 100 to raise the power voltage higher to a high voltage transmission voltage in order to lower the power loss in the transmission line, and the other smaller branch is fed into the auxiliary transformer 102 which is providing power for in-plant use. The output power from the stepup transformer 100 is fed into the last high voltage circuit breaker 104 and then to the outside power grid as power 106. All equipment, the step-up transformer 100, the auxiliary transformer 102, and the high voltage circuit breaker 104 are located in a switchyard 108. The FIG. 9 lists the recommended generator voltages and transformer voltages according to the generator MVA (mega-volt-ampere) sizes.

Figure 8:
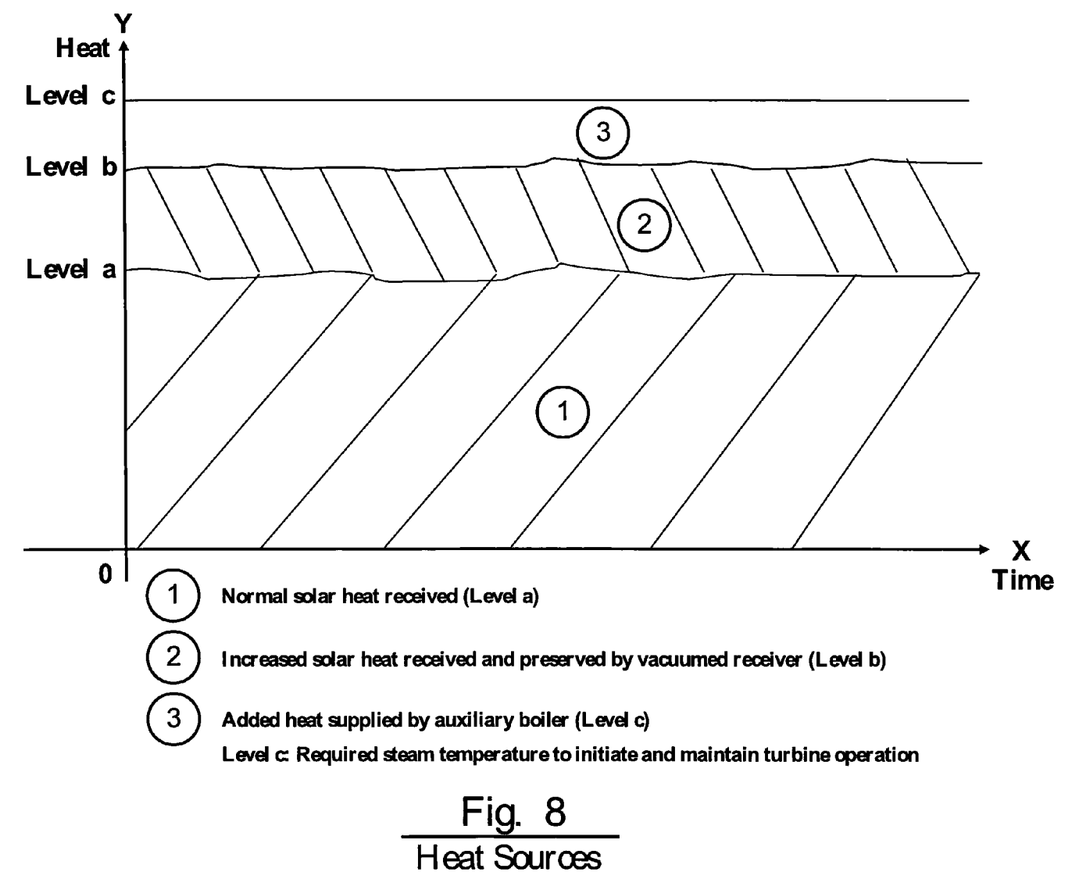
FIG. 8 is a chart showing the different portions of heat coming from their respective heat sources, namely solar energy, the increased collector heat by employing vacuum technology or by filling the gap with nitrogen gas to reduce the heat loss, and the heat added by the auxiliary boiler/steam superheater.

FIG. 8 is showing a chart of the different portions of heat coming from their respective heat sources, namely the solar energy, the increased solar collector heat by employing vacuum technology or by filling the gap with nitrogen gas to reduce the heat loss, and the heat added by the auxiliary boiler/steam superheater.

There are several considerations for the optimal sizes of a solar thermal power plant. If it is too small, then the output power is too insignificant and it is not worth the effort and the investment. For a large scale plant, the amount of available solar energy in a short time span of every moment has a limit. Considering all of the limiting conditions, a range of 1 MVA to 300 MVA seems to be most desirable. It would be difficult to achieve anything higher than this range cost-wise. In order to generate electrical power in the range of 300 megawatts (MW), the total surface area of the collecting surfaces 14 in array 80 should be about 300 acres. The total area required for a complete solar thermal power plant is estimated at 600 acres. The additional 300 acres are for the space of office building, turbine generator building, control building, battery building, auxiliary building, assembly areas, shops, storages, switchyard, water storage facility, and some yard areas.

The most commonly rated output of a nuclear power plant is 1,000 MVA, while for a large coal fired power plant it is commonly rated as 600 MVA. These numbers have been commonly based on operating experiences and the available technology. The nuclear and the coal-fired power plants rely on vast thermal power output to generate high temperature steam in a quick manner at every moment. It is different for a solar thermal power plant. The highest solar energy available during the day is only about 1880 BTU per square foot per day average (in the southwest U.S. area), or lower.

The required cooling water for a 300 MW plant of this type is about 3,600 gallons per minute, but the water can be recycled. A water pool may be provided for storing reserved water for long term operation.

The amount of coal required in a 300 MW coal power plant is about 150 tons per hour. For a 10-hour operating day, such a plant consumes about 1,500 tons per day. At a cost of $50 per ton, the daily coal cost is about $75,000 per day, and the annual coal cost is about $27,375,000. Therefore, the saving on the cost of coal used in a 300 MW plant=90%=$24,637,500 per year, estimating that 10% of the currently-used natural gas would be consumed. Using this assumption leads to a reduction of $CO_2$ in the atmosphere=90%×1,500 ton×365 days=492,750 tons per year for a 300 MW plant. The 300 miles by 300 miles corridor from Las Vegas, Nev. to the south till Mexico border along the Colorado River is the best area in the U.S. for development of solar power. It has the solar energy of 1880 BTU per square foot per day average, highest in the United States. The area is mostly in the desert area.

Figure 9:
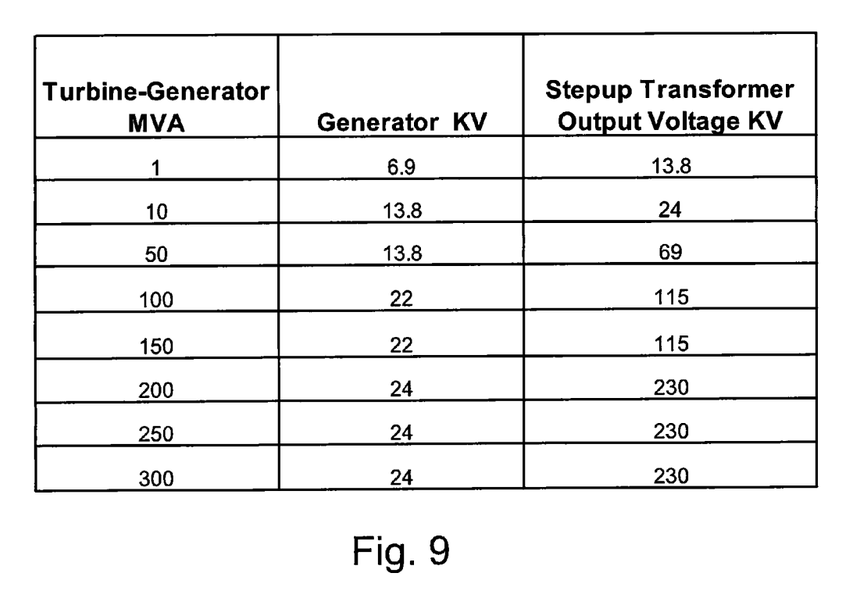
FIG. 9 lists the recommended optimal generator rated voltages and outgoing power line voltages.

To decide transmission line voltage the factors to be considered are the MVA to be transported and the line loss. High current with low voltage will cause high resistance loss. High voltage will make the current lower but it is more difficult to handle and it creates safety concern. Therefore the most optimal line voltage should be carefully evaluated. FIG. 9 lists the recommended transmission line voltages.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

CONCLUSIONS

In the southwest of United States, an area starting from the Las Vegas in the State of Nevada extending south along the Colorado River to the area including Mexico land, and extending 150 miles each to the west and to the east, that is an area of about 300 miles by 300 miles square area has an average of as high as 1880 BTU per square foot per day. This is the highest among all areas in the United States. Its solar energy potential should be actively developed. This invention was conceived with the objective of providing a way to develop solar power with low cost, efficiency, reliability and practical facility.

The disadvantages of a photovoltaic power system (silicon solar panel) are high cost and low efficiency. The high cost discourages investment. The low efficiency makes the unit cost per produced kWH (kilo-Watt-hour) power much higher than those produced by a fossil plant or a nuclear power plant. At present, few bankers are willing to finance the large photovoltaic power system.

The disadvantages of a mirror reflection type solar thermal power plant are also high cost and low efficiency. In those plants, a hundred thousand mirrors are required. The usable mirrors at any moment are only a fraction of all, and it is an indirect sunlight. It cannot efficiently use all available natural sunlight directly so it is of low efficiency. The recently completed Ivanpar solar thermal plant costs $2.2 billion. The press reported that this cost was too high, so the plant might be the last of this type.

The disadvantage of a parabolic solar receiver type thermal power plant is the low efficiency. It is difficult to accumulate sunlight effectively with this type of power plant. Some plants of this type were abandoned after a short time of operation because the produced kWHs were too low, making the recovery of investment almost impossible.

The disadvantages of a fossil power plant are the emission of too much $CO_2$ and polluting the environment. The global warming created by the excess $CO_2$ emission is causing an environmental disaster.

The disadvantage of a nuclear power plant is huge. The horrible effects caused by the radioactive materials used in this technology to life and to the environment are enormous. The radioactive material kills or damages life. The effects can be fast and in large scale, and it is present with mining the uranium, refining it, and treatment of the radiation waste material after the nuclear fuels are spent. The disasters that happened in Three-mile Island, Fukushima Nuclear Power Plant in Japan, and the Chernobyl Nuclear Power Plant in Ukraine are clear examples of the cost. There is no absolute safety guarantee for a nuclear facility. It is a disaster waiting to happen in any nuclear facility.

This invention is conceived with the intention to solve or at least to reduce above mentioned safety risks, as well as cost and efficiency concerns. The design of this dual energy solar thermal power plant would not pose much safety concerns because the plant will use a low temperature turbine. The needed materials are common and obtainable with reasonable costs, and the main fuel, solar power, is freely available. With this design, the safety to the operating personnel and environment human is reasonably controllable.

The proposed design will use a temperature sensor to check the temperature of the fluid or water inside the solar energy collector fluid path, repeat the circulation cycle if the temperature is low and not at the desired point until the desired temperature is achieved. The design will also use two pressurizers, one at each side of the primary and secondary water loops to prevent the water from becoming steam prematurely.

The design will employ a synchronizer for the main generator to synchronize the generated power to the outside power grid, preventing a grid blackout accident. The design also proposes a range for realizable plant capacity in MVA, making it flexible depending on available funds.

The design proposes a red color as an alternative color for the solar energy absorbing plan in the collector. This is for the plant owner who emphasizes the aesthetic effect of the plant. The design also proposes an arch type glass on the solar energy collector, in order to prevent the glass breaking by external atmospheric pressure when the gap is in vacuum for the purpose of harnessing more solar energy.

Advantages of using an auxiliary boiler/steam super heater are: 1. Solve technical difficulty. 2. Extend the duration of effective supply time of natural gas by five times. It will extend the effective natural gas supply from 100 years to 500 years.

The selection of the generator MVA capacity is dependent on the power demand, available funds, and available land. Once the MVA is decided, then the generator rated voltage can be decided. FIG. 9 gives a recommended voltage selection. The selection is based on the evaluation of economy, easy of control and safety concerns. Finally, the plant power output voltage, the transmission line voltage, must be determined. The important concerns are to minimize the line resistance loss (copper loss or aluminum loss, whichever is the conductor material), the material cost of the conductor, and safety. Increasing the diameter of the conductor will decrease the resistance loss, but it also increases the amount of copper at a higher cost, and vice versa. An optimal size should be selected. FIG. 9 suggests the recommended optimal selection.

The solar thermal power plant design proposed in this invention has the advantage over a nuclear power plant because it is safe from radiation hazards and much lower cost; it has the advantage over a coal fired power plant because of emitting much less $CO_2$ and much less pollutants, also much lower cost; it has advantage over a photovoltaic (silicon plate) power plant because the cost is much lower and the capability to produce electricity is much higher and simpler; it has the advantage over the mirror type solar thermal power plant because the cost is lower and the efficiency is higher; and it has advantage over the parabolic receiver type solar thermal power plant because of a simpler design, the cost is lower, and the efficiency is higher.

The invention claimed is:

1. A dual energy solar thermal power plant having a rated output power range from 1 MVA (mega Volt-Ampere) to 300 MVA range with dual energy sources being solar energy and natural gas comprising:
  a. a plurality of solar energy collectors connected in series, each having:
    i. a body that has a solar energy absorbing collection surface, wherein the body has a first thickness from 2.3 inches to 3 inches, wherein the body has a second thickness at 0.25 to 0.5 inches, wherein the body tapers from the first thickness to the second thickness;
    ii. a window formed from transparent glass configured to cover the solar energy absorbing collection surface, wherein the window is transparent to solar radiation between a UV wavelength and an infrared wavelength;
    iii. a frame enclosing a periphery of the window, wherein the frame has frame insulation;
    iv. a bore extending completely through the body along its length and aligned along an axis at a center portion, wherein the bore carries a heat transfer fluid, wherein the bore is connected in series to another solar energy collector of the plurality of solar energy collectors by an insulated tube;
    v. a layer of insulation disposed below the body on the surface opposite the collection surface;

vi. a mounting structure supporting the body;
b. a heat exchanger receiving heat from the heat transfer fluid, wherein the heat transfer fluid circulates in a primary loop, wherein a heat transfer circulation pump circulates the heat transfer fluid through the primary loop; and further comprising a heat transfer fluid storage tank, wherein the transfer fluid storage tank retains a quantity of heat transfer fluid;
c. a steam superheater receiving heat from the heat exchanger, wherein the steam superheater provides superheated steam for the dual energy solar thermal power plant, wherein the superheated steam is in a secondary loop, wherein the steam superheater has a water section and a burner section, wherein the burner section drives the dual energy solar thermal power plant at night;
d. a steam turbine powered by steam from the superheater; wherein the steam turbine is a low temperature turbine having a required minimum steam temperature of less than 360° C.;
e. an electrical generator powered by the steam turbine, wherein the steam turbine drives the electrical generator to provide electrical power output as an electrical current;
f. a condensate pump receiving a stream of exhausted steam from the steam turbine, wherein the condensate pump sends the stream of exhausted steam to a condenser; a feed pump receiving water from the condenser, wherein the feed pump feeds a deaerator, wherein the water is then recycled back to the heat exchanger;
g. a temperature sensor mounted on the plurality of solar energy collectors, wherein the temperature sensor is configured to sense a temperature of the heat exchange fluid;
h. a third valve and a fifth valve, wherein the third valve and the fifth valve are configured so when the temperature sensor indicates that the temperature of the heat exchange fluid is less than a desired setpoint temperature the third valve is closed and the fifth valve is opened to allow the heat exchange fluid to recirculate in the plurality of solar energy collectors until the desired setpoint temperature has been reached;
i. a first pressurizer and a second pressurizer are connected to the secondary loop maintaining the water in liquid state when the temperature is above a boiling point;
j. a sixth valve controlling a heated fluid flow from the heat exchanger to the steam superheater;
k. a switchyard holding a main step-up transformer, an auxiliary transformer, and a high voltage circuit breaker;
l. a switchgear receiving the electrical current from the electrical generator, wherein the switchgear divides the electrical current into two branches with one large branch fed into the main step-up transformer and one smaller branch fed into the auxiliary transformer that powers the dual energy solar thermal power plant, wherein the high voltage circuit breaker receives output power from the stepup transformer before sending it to an outside power grid as electrical power.

2. The dual energy solar thermal power plant of claim 1, wherein the solar energy absorbing collection surface is red, and wherein the solar energy collection surface is substantially flat and planar.

3. The dual energy solar thermal power plant of claim 1, wherein the window is formed as an arch glass, wherein the arch shape glass resists breaking due to a vacuum in a gap.

4. The dual energy solar thermal power plant of claim 1, wherein a synchronizer is used for the turbine-generator set during power generation.

5. The dual energy solar thermal power plant of claim 1, wherein the first pressurizer and the second pressurizer both prevent water from evaporating into steam prematurely.

6. The dual energy solar thermal power plant of claim 1, wherein voltage of an outgoing power is selected.

7. The dual energy solar thermal power plant of claim 1, wherein multiple modes supply power at night when no solar power is available by means of a combination of battery bank, continued power generation by the heat stored in liquid salt heated by solar power during daytime, using the auxiliary boiler to generate steam, and relying on the balance of power on hydro power.

8. The dual energy solar thermal power plant of claim 1, wherein the body is aluminum.

9. The dual energy solar thermal power plant of claim 1, wherein the dual energy solar thermal power plant has a generator voltage output selected from the group of 13.8 kV, 22 kV, 69 kV, 115 kV, and 230 kV.

* * * * *